S. A. NEIDICH.
DUPLICATING MACHINE.
APPLICATION FILED SEPT. 28, 1910.
1,089,147.
Patented Mar. 3, 1914.
9 SHEETS—SHEET 4.
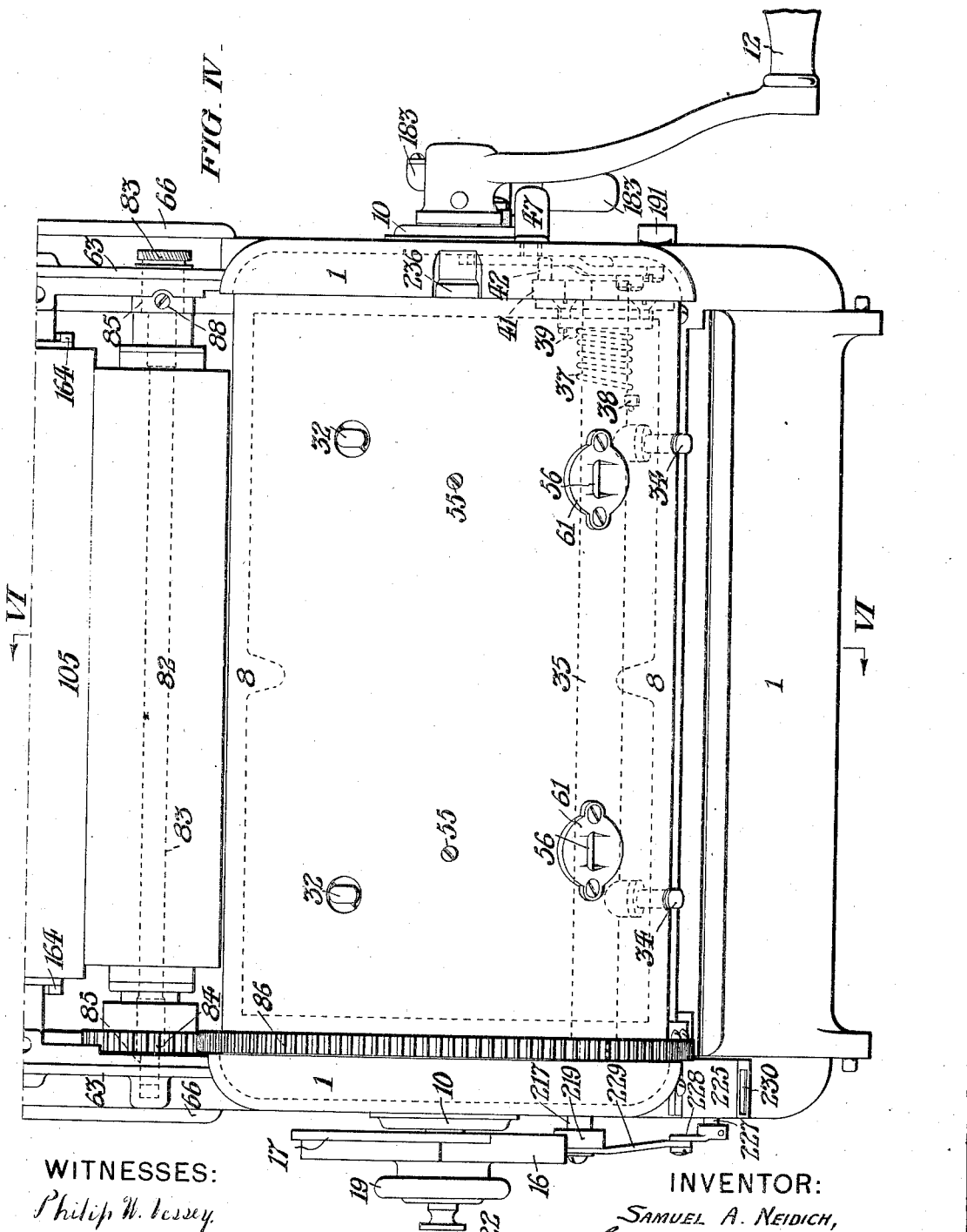
WITNESSES:
Philip W. Lessey
Gertrude N. R. Mattson.
INVENTOR:
SAMUEL A. NEIDICH,
By Arthur E. Paige
Atty

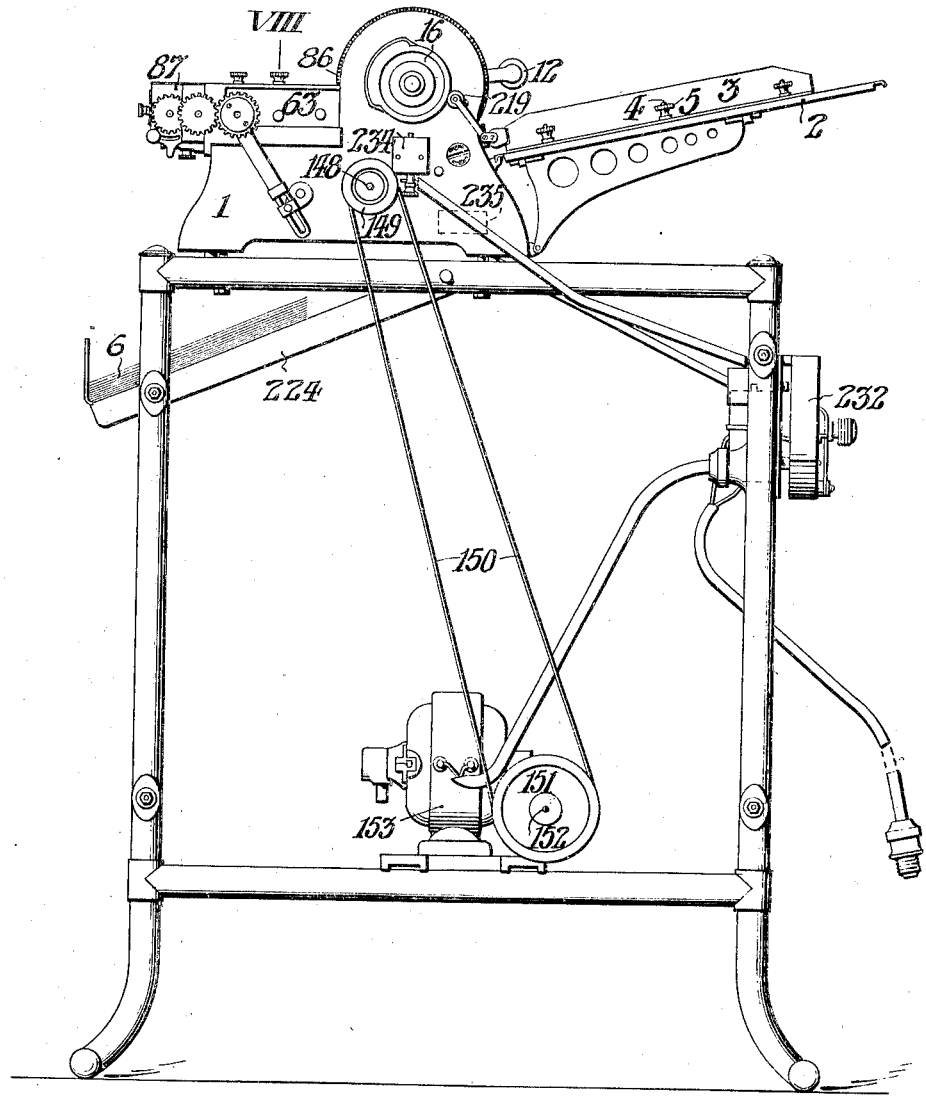

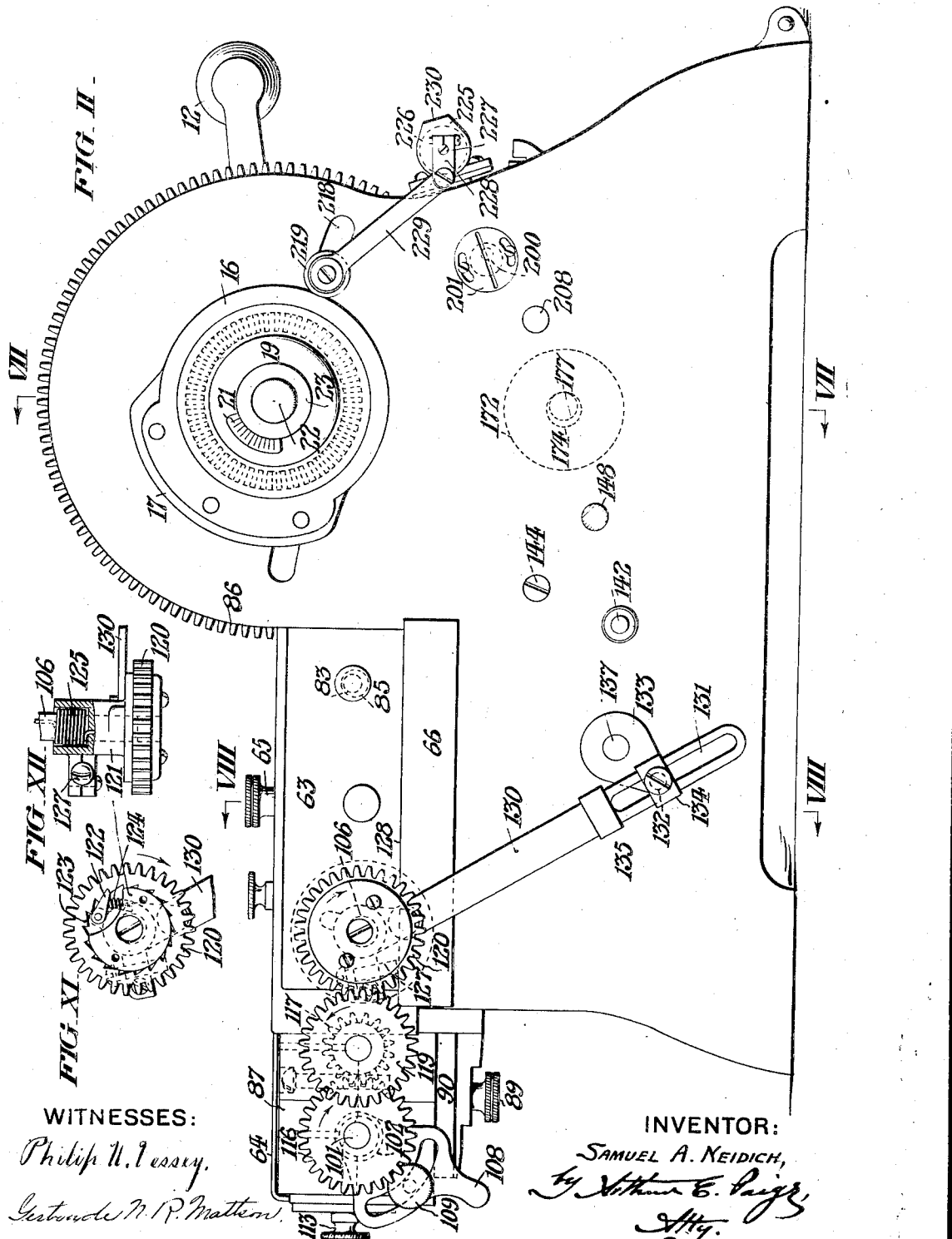

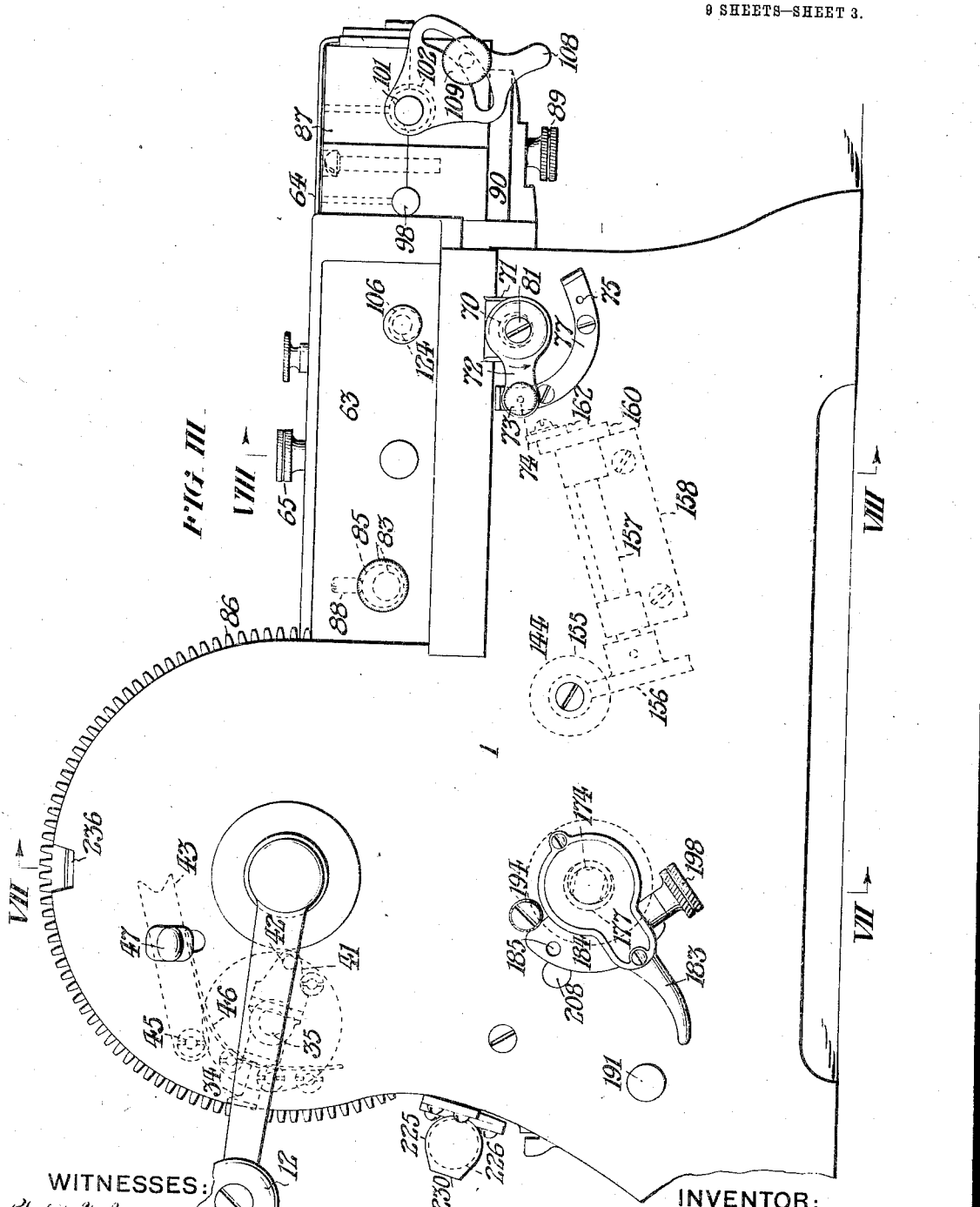

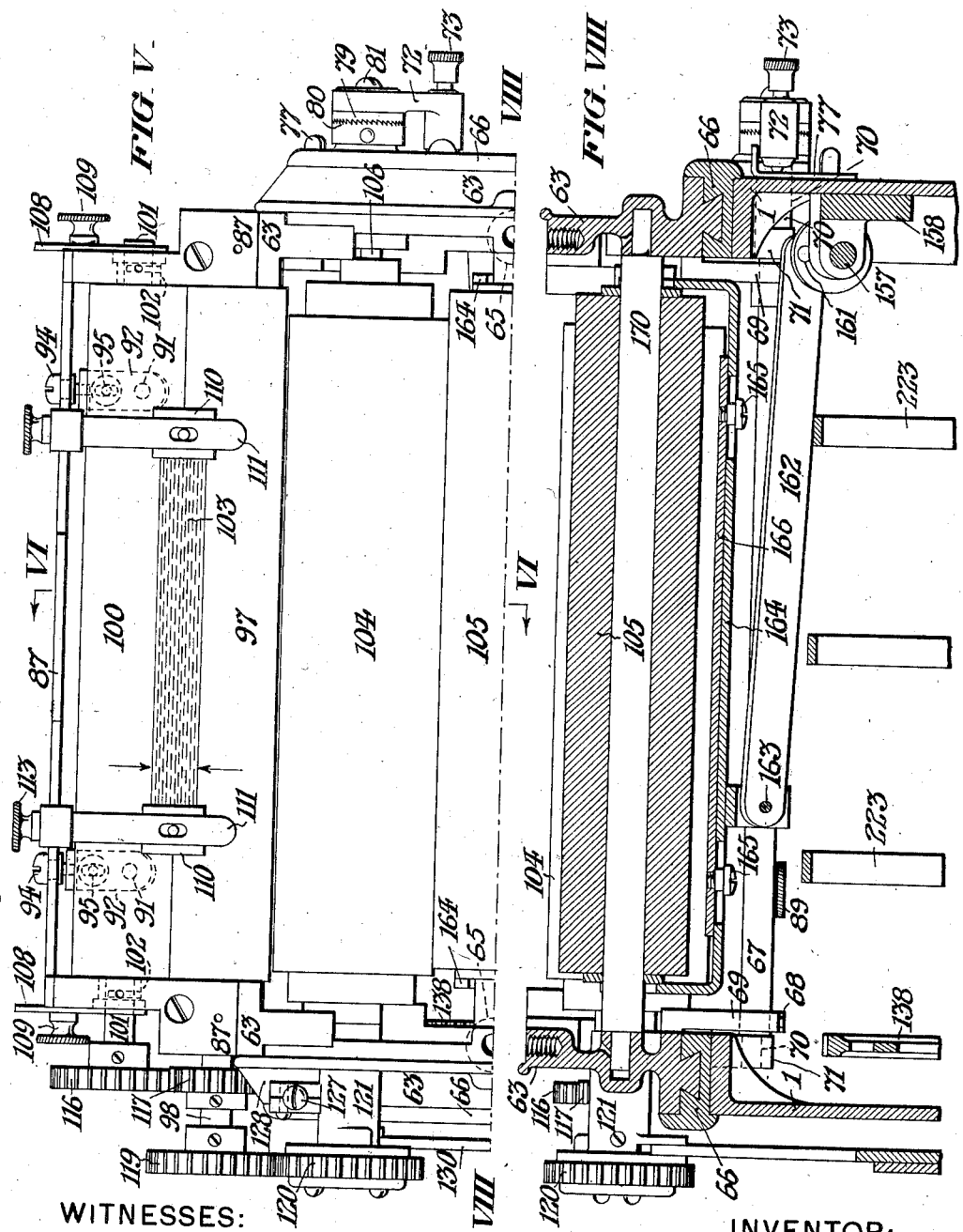

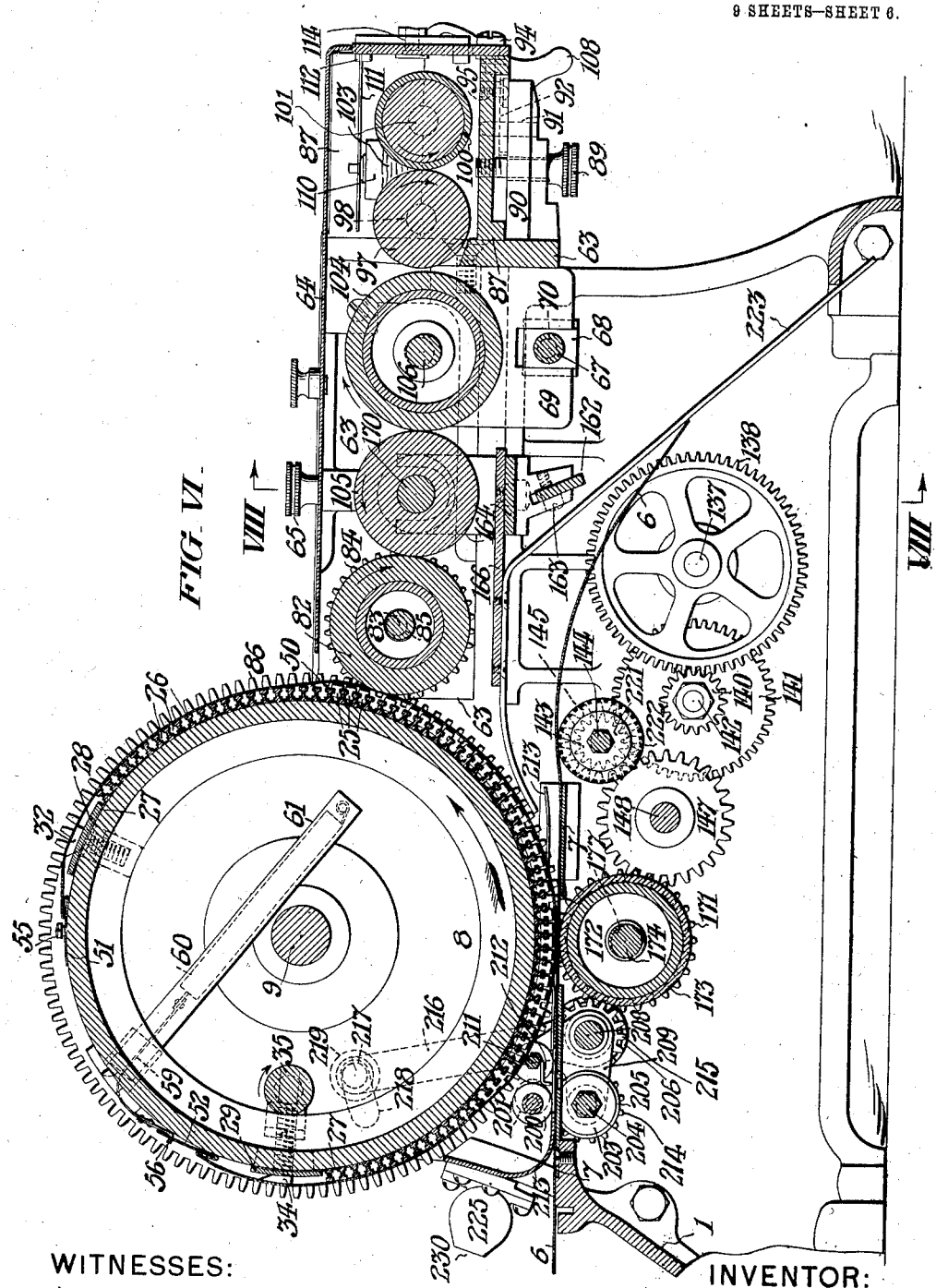

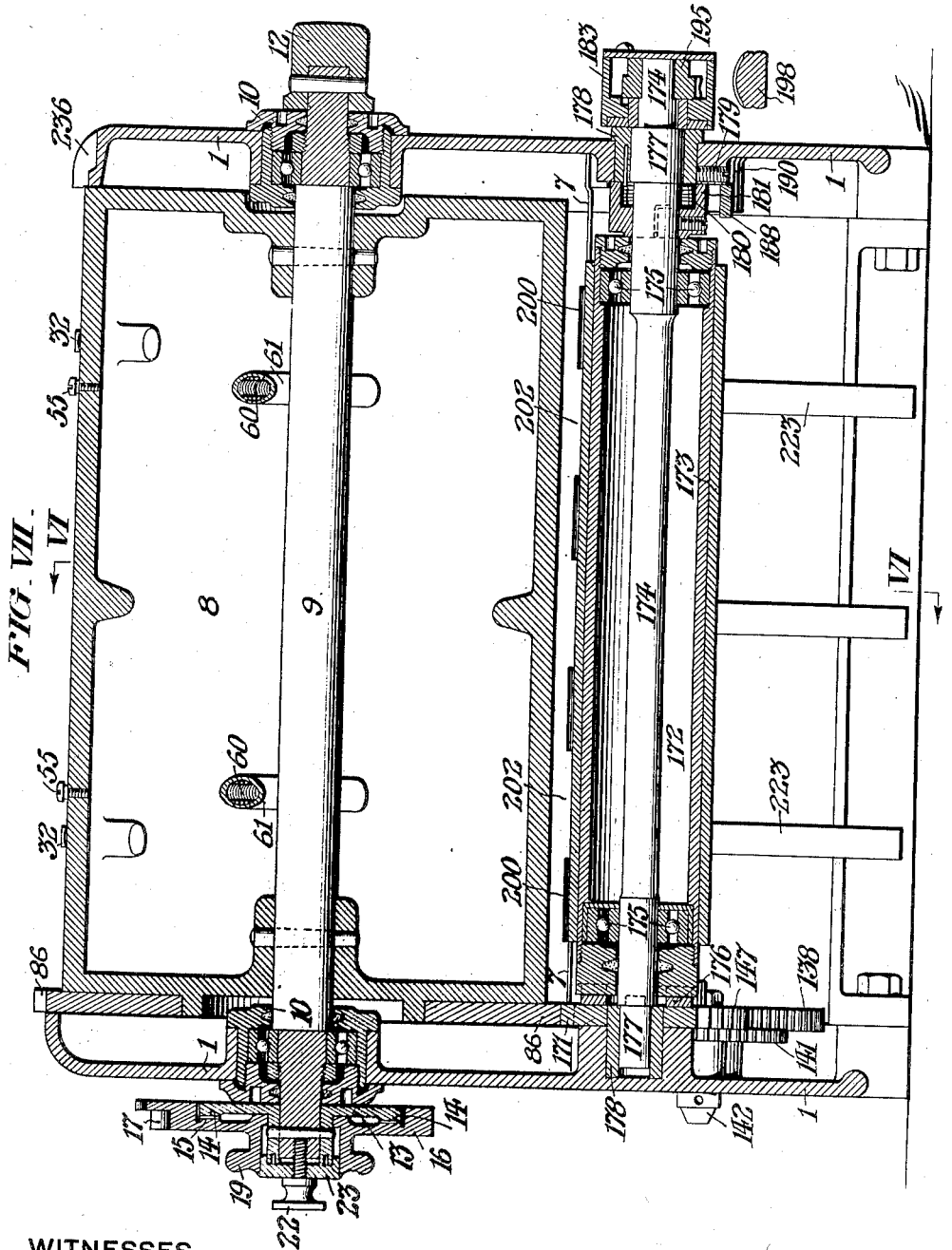

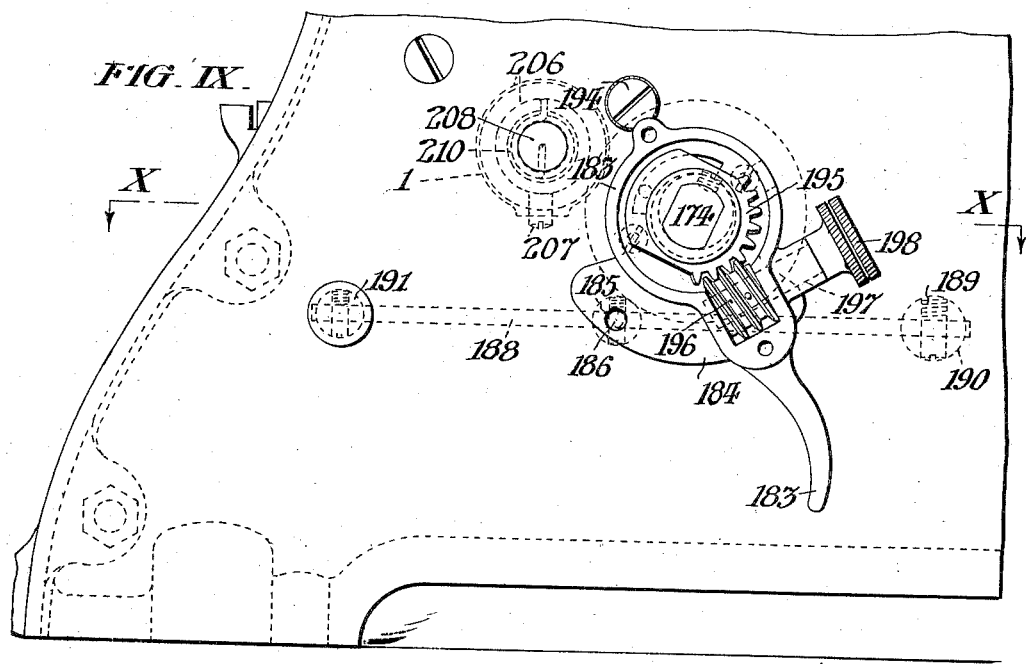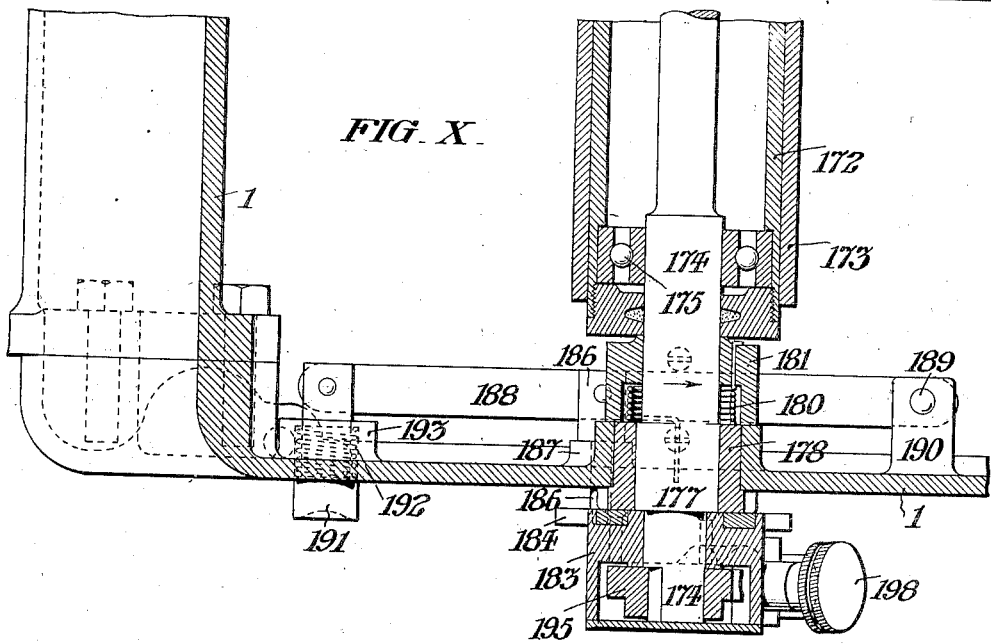

S. A. NEIDICH.
DUPLICATING MACHINE.
APPLICATION FILED SEPT. 28, 1910.
1,089,147.
Patented Mar. 3, 1914.
9 SHEETS—SHEET 9.
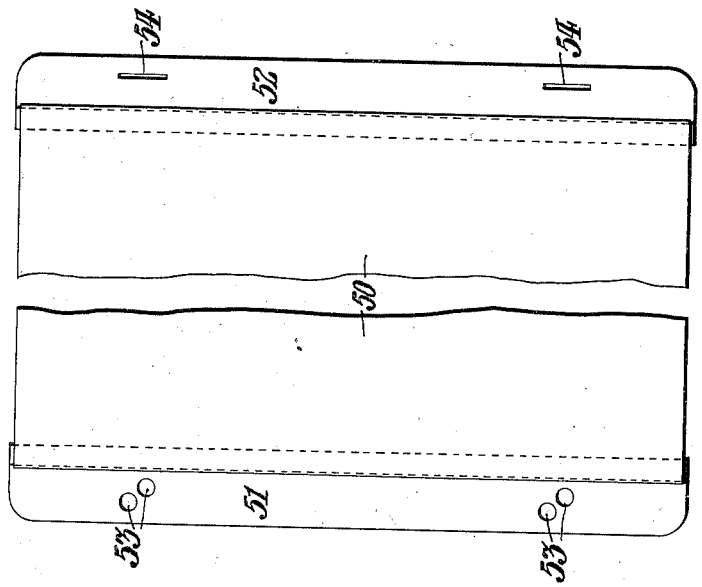
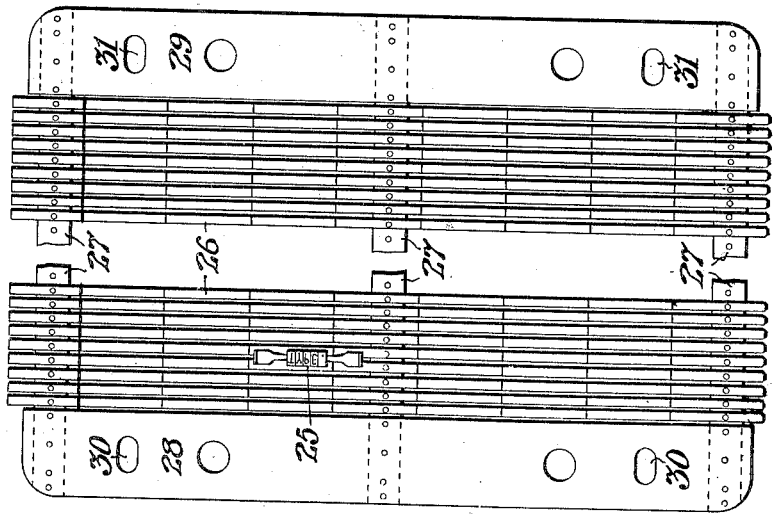
WITNESSES:
Philip W. Vessey.
Gertrude N. P. Mattson.
INVENTOR:
SAMUEL A. NEIDICH,

UNITED STATES PATENT OFFICE.

SAMUEL A. NEIDICH, OF EDGEWATER PARK, NEW JERSEY, ASSIGNOR TO THE AMERICAN MULTIGRAPH COMPANY, OF CLEVELAND, OHIO, A CORPORATION OF OHIO.

DUPLICATING-MACHINE.

1,089,147.  Specification of Letters Patent.  Patented Mar. 3, 1914.

Application filed September 28, 1910. Serial No. 584,202.

*To all whom it may concern:*

Be it known that I, SAMUEL A. NEIDICH, of Edgewater Park, in the State of New Jersey, have invented a certain new and useful Improvement in Duplicating-Machines, whereof the following is a specification, reference being had to the accompanying drawings.

My invention relates to machines adapted for printing impressions having the appearance of being manually typewritten, and may be employed with particular advantage in making assimilated printed and typewritten work in accordance with the process described in Letters Patent of the United States #640,013 granted to me December 26th, 1899.

As hereinafter described, my invention may be embodied in a machine comprising a rotary printing drum and a coöperative rotary platen. Said drum is adapted to print from type set in a flexible chase detachably held on said drum, and, the ink for the printed impression is derived from a transfer sheet of textile fabric which is detachably held stationary on said drum over the type faces. Said sheet may be supplied with ink for each impression by mechanism including a series of rollers interposed between said drum and an ink fountain, the terminal transfer roller being presented against said sheet and the other rollers coöperating to intermittently withdraw a definite, adjustably variable amount of ink from said fountain and deposit it upon said transfer roller.

The present invention is concerned primarily with the inking fabric, the means for holding it over the type on the drum, and the means whereby it may be periodically reinked. For claims on the other features shown, reference should be made to the following divisional applications filed September 8, 1911, namely: For the details of the inking mechanism, application No. 648,324; for the platen adjustment and throwout, No. 648,325; for the paper feed mechanism, No. 648,327; for the detachable chase held on the drum, No. 648,324, as well as my prior application No. 440,430, filed June 21, 1908.

My invention includes the various novel features of construction and arrangement hereinafter more definitely specified.

In the drawings: Figure I is an elevation of the left hand side of a duplicating machine. embodying my invention, conveniently provided with a supporting stand and paper sheet feed chute. Fig. II is an elevation of the left hand side of said machine, on a larger scale. Fig. III is an elevation of the right hand side of said machine on the same scale as Fig. II. Fig. IV is a plan view of that portion of said machine at the right hand side of the line VIII in Fig. I. Fig. V is a plan view of that portion of said machine at the left hand side of said line VIII in Fig. I. Fig. VI is a vertical sectional view, taken on the line VI, VI in Figs. IV and V. Fig. VII is a vertical sectional view, taken on the line VII, VII in Figs. II and III. Fig. VIII is a vertical sectional view, taken on the line VIII, VIII in Figs. I, II, III, V and VI. Fig. IX is a fragmentary elevation of the right hand side of said machine, on a larger scale than Fig. III, showing the platen adjusting lever with its cover plate removed. Fig. X is a fragmentary plan sectional view, taken on the line X, X in Fig. IX. Fig. XI is an end view of the ratchet clutch mechanism for intermittently rotating the inking rollers. Fig. XII is a fragmentary plan sectional view of said clutch mechanism. Fig. XIII is a fragmentary plan view of the flexible chase shown in section in Fig. VI. Fig. XIV is a fragmentary plan view of the inking sheet shown in section in Fig. VI.

In said figures, the duplicating machine frame 1 is provided with the paper feed chute 2 having guides 3 adjustably secured by bolts 4 and nuts 5 so as to direct cut sheets of paper 6 into said machine over the feed table 7 beneath the rotary printing drum 8. Said drum has its shaft 9 journaled in bearings 10 in said frame 1, having at one end the operating handle 12 exterior to said frame and at its other end the collar 13 with the crown clutch teeth 14 engaging the crown clutch teeth 15 in the rotatably adjustable cam 16 which controls the paper feed as hereinafter described. Said cam has the high portion 17 shown in Fig. II, and is conveniently provided with the knob flange 19 and circumferential series of graduations 21 to facilitate its rotary adjustment with respect to said drum, being rigidly connected with said drum shaft 9 by the screw 22 and washer 23 shown in Fig. VII.

As shown in Fig. VI, said drum 8 carries type 25 set in a detachable flexible chase, which as shown in Figs. VI and XIII comprises the channel bars 26 which are maintained in parallel relation by the flexible bands 27 connected with the opposite end attaching plates 28 and 29 extending transversely with respect to said bands; said bars and plates being conveniently riveted to said bands 27 as indicated in Fig. XIII. Said plates 28 and 29 have holes 30 and 31, to engage attaching means on said drum, including the pair of stationary hook studs 32 and the pair of oscillatory hook levers 34 projecting from the circumference of said drum as shown in Fig. VI and respectively adapted to engage in said holes 30 and 31. Said hook levers 34 are carried by the rock shaft 35, which as indicated in Figs. IV and VI is journaled in the opposite ends of said drum 8 and has the spring 37 encircling said shaft 35, engaging the pin 38 on said shaft and the pin 39 on said drum and tending to rock said shaft 35 to press said hook levers 34 in the direction of the arrow adjoining said shaft 35 in Fig. VI, and thus wrap said chase tightly around the drum.

As indicated in Figs. III and IV said shaft 35 has the crank 41 with the pin 42 exterior to said drum 8, by which said shaft may be turned when said pin is engaged by the catch lever 43. Said lever is pivoted at 45 in said frame and has the spring 46 tending to turn it aside from the path in which said crank pin 42 is carried by the rotation of said drum 8 in said frame, but has the handle 47 extending exterior to said frame, whereby said lever may be manually held in the path of said crank pin 42 to catch and turn the latter and thus rock said hook levers 34 to the opposite end of their range of movement when it is desired to attach or detach said chase with respect to said drum. Said drum 8 is provided with means to detachably hold stretched over the type 25 in stationary relation therewith the ink transfer sheet of textile fabric 50 shown in Figs. VI and XIV having the attaching plates 51 and 52 with pairs of holes 53 and 54 at its respectively opposite ends; the pair of stationary studs 55 on said drum being adapted to engage in either pair of said holes 53 of the plate 51, and, the plate 52 being engaged by the pair of leashes projecting from said drum, including the hooks 56 engaging in the holes 54 and connected by the flexible metal tapes 59 to the spiral springs 60 carried in the tubes 61 which are in rigid relation with said drum 8. Said plate 51 is provided with two pairs of holes 53 so that said sheet may be held in different positions to permit it to be uniformly worn out.

Either said ink transfer sheet 50 or the type 25 may be reinked after each printing impression by the mechanism mounted in the carriage 63 under the removable cover 64 normally retained by the thumb screws 65. Said carriage being fitted to slide in the bearings 66 on said frame indicated in Fig. VIII, is conveniently shifted toward and away from said drum 8 by the shaft 67 which as shown in Fig. VI has the bearing blocks 68 arranged to slide in the carriage flanges 69, and the eccentrics 70 journaled in the bearings 71 in said frame. Said shaft 67 may be turned by the handle 72 shown in Figs. III and V having at its free end the spring pressed plunger detent 73, to engage the sockets 74 and 75 in the plate 77 on said frame; the arrangement being such that when said handle 72 is raised said carriage 63 is shifted toward the drum 8, to operative position, and when said handle is lowered said carriage is shifted away from said drum, to inoperative position. Although the extent of the backward and forward movement of said carriage 63 is limited by the location of said sockets 74 and 75; said handle 72 may be rotatably adjusted in connection with said shaft 67, having the crown clutch hub 79 fitted to engage the crown clutch collar 80 pinned on said shaft; said handle being rigidly secured in adjusted relation with said shaft by the screw 81 shown in Figs. III and V. Said inking mechanism comprises five rollers, including the rubber faced ink transfer roller 82 which when said handle 72 is upturned to the position shown in Figs. III and V is presented against said transfer sheet 50 as shown in Fig. VI, to transfer ink to said sheet. Said roller 82 has the gear 84 engaging the gear 86 on the drum 8 so as to rotate with the latter, and is journaled on the shaft 83 having the eccentrics 85 journaled in said carriage 63. Said shaft 83 is rotatably adjustable but is normally held stationary by the set screw 88. The other four rollers of the inking mechanism have means coöperating to intermittently withdraw a definite, adjustably variable amount of ink from the fountain 87 and deposit it on said transfer roller 82. As indicated in Figs. III and VI said ink fountain 87 is detachably connected with said carriage 63 by the thumb screws 89 which extend through the brackets 90 on said carriage in engagement with said fountain; the latter being precisely located by the dowel pins 91 projecting from said brackets 90 into the socket plates 92 which are rigidly secured in adjustable relation with said fountain by the screws 94 and 95 shown in Figs. V and VI.

As shown in Figs. V and VI, the metal faced roller 97 has its shaft 98 journaled in immovable bearings in said fountain, and, the rubber faced roller 100 has its shaft 101 journaled in the eccentric bearings 102 in said fountain. The supply of ink 103 in said fountain 87 is upheld between said rollers 97 and 100 as shown in Fig. VI; said rollers being intermittently rotated in the direction of the arrows marked thereon to dispense said ink in a thin film on the surface of said roller 97 from which it is intermittently doffed by the rubber faced doffer roller 104 which alternately contacts with said roller 97 and with the metal faced distributing roller 105 and applies the ink to the latter which is continuously rotated solely by contact with said transfer roller 82. Said doffer roller 104 being loosely mounted upon its shaft 106 is only turned when in contact with said roller 97 or in contact with said distributing roller 105; said roller 104 being turned more than five revolutions in the direction of the arrow marked thereon in Fig. VI each time it contacts with the distributing roller 105 but being turned in the opposite direction a fraction of a revolution when in contact with said roller 97. Said eccentric bearings 102 for said roller 100 have respective wing levers 108 arranged to be clamped in adjusted position by the screws 109 on said fountain 87, so that, by turning said bearings, the axis of rotation of said roller 100 may be adjusted toward and away from said roller 97, to vary the pressure of contact of said rollers and thus vary the thickness of the film of ink spread upon the dispensing roller 97; the lateral location and extent of said film of ink being limited by the adjustable gates 110 shown in Figs. V and VI. Said gates being wedge shaped are pressed between said rollers 97 and 100 by the spring arms 111 on the cross heads 112 which are adjustable toward and away from each other and are secured in adjusted position by the thumb nuts 113 on the bolts 114 which extend through slots in said fountain 87.

As shown in Figs. II and V the rubber faced ink spreading roller 100 has the gear wheel 116 on its shaft 101 engaging the gear wheel 117 on the shaft 98 of the metal faced ink dispensing roller 97, so that as said rollers are turned together in the direction of the arrows in Figs. V and VI, but at different speeds, the ink 103 is drawn down between them and spread on said roller 97 in a film the thickness and extent of which has been adjustably predetermined.

Referring to Figs. II, V, XI, XII: In order to effect said differential turning movement of said rollers, the shaft 98 of said roller 97 has the gear 119 engaging the ratchet clutch gear 120, which is intermittently turned by the crank head 121 having the pivoted, spring pressed pawl 122 engaging the ratchet 123 in said gear 120, so that the latter is turned in the direction of the arrow in Fig. XI whenever said head 121 is turned in that direction, but is released and remains stationary during reverse movement of said head. Said crank head 121 is fixed on one end of the shaft 106 of said doffer roller 104; both ends of said shaft being eccentric with respect to the central portion thereof upon which said roller 104 turns, so that as said shaft is rocked in its bearings 124 in the carriage 63 the axis of rotation of said roller 104 is shifted back and forth as above described. Said crank head 121 has the spring 125 shown in Fig. XII tending to turn it into the position where the adjustable stop screw 127 rests on the ledge 128 of the carriage 63 as shown in Fig. II, in which position said shaft 106 holds the roller 104 in contact with the distributing roller 105 so as to be rotated by the latter. However, said head 121 is intermittently rocked in the direction of the arrow shown in Fig. XI, by the pitman 130 shown in Fig. II having the slot 131 for the crank pin 132 on the crank 133. Said pin 132 has the block 134 to encounter the shoulder 135 on said pitman 130 to thrust the latter upwardly during part of the continuous rotary movement of said crank 133 which is carried by the shaft 137 journaled in the frame 1 and having the gear 138 shown in Fig. VI, fixed thereon inside said frame. Said gear is continuously rotated by engagement with the gear 140 carried by the gear 141 journaled on the stationary stud shaft 142 in said frame; said gear 141 being engaged by the gear 143 on the shaft 144 which has the gear 145 engaging the gear 147 on the main driving shaft 148 which is journaled in both side members of the frame 1 and as shown in Fig. I is provided with the belt wheel 149 exterior to said frame connected by the driving belt 150 with the belt wheel 151 on the counter shaft 152 of the electric motor 153. Said shaft 144 has the worm 155 fixed thereon as indicated in Fig. III engaging the worm gear 156 on the counter shaft 157 journaled in the bearings 158 on the right hand side member of said frame 1. Said shaft 157 has the wrist plate 160 with the crank pin 161 engaging the link 162 which at its opposite end is connected by the pivot pin 163 with the yoke 164 shown in Figs. VI and VIII which is upheld by the screws 165 so as to slide freely on the cross bar 166 which is fixed in said frame 1. Said distributing roller 105 rotates freely between the upturned ends of said yoke 164 as shown in Figs. VI and VIII, but is longitudinally reciprocated on its shaft 170 by said yoke; said shaft 170 being journaled in said carriage 63 as shown in Fig. VIII.

As shown in Fig. VI, said main driving shaft gear 147 and the gear 86 on the printing drum 8 engage the gear 171 which rotates the platen 172 having the rubber face 173 in coöperative relation with said drum. As shown in Figs. VII and X said platen 172 being carried by the normally stationary shaft 174, is arranged to rotate upon the bearing balls 175, and is connected with said gear 171 by the Whitworth coupling ring 176 which permits said platen to be shifted without interfering with the operation of said gear 171 which is journaled on the concentric bearing 178 of said shaft 174. In order to shift the axis of said platen toward and away from said drum 8, to render it operative and inoperative and to vary the depth of the printed impressions; said shaft 174 is provided at its opposite ends with the eccentrics 177 journaled in the two bearings 178, which are respectively concentric and eccentric, the latter being rotatably adjustable but normally held stationary in said frame 1 by the set screw 179. Said shaft 174 is encircled by the spring 180 having one end fixed in the collar 181 on said shaft and the other end held in said eccentric bearing 178 in stationary relation with the frame 1. Said spring 180 tends to turn said shaft 174 in the direction of the arrow marked thereon in Fig. X to shift the platen 172 into inoperative position, while maintaining it parallel with said drum shaft 9, by said eccentrics 177. However, said shaft may be manually turned by the lever 183 to present said platen 172 in operative position, and, said lever has the flange 184 with the socket 185 to engage the detent 186, to detain said lever 183, shaft 174 and platen 172 in the operative position of the latter with respect to the drum 8 as shown in Fig. X. Said detent 186 is mounted to reciprocate in the bearing 187 in the frame 1 and is carried by the releasing lever 188 which is fulcrumed at 189 in the stud 190 on said frame and has at its opposite end the push button plunger 191 which is normally thrust outward as shown in Fig. X by the spring 192 in the frame socket 193. It is to be understood that the arrangement is such that when said button 191 is pushed inward said detent 186 is withdrawn from the socket 185 in the impression lever flange 184 permitting said lever and the platen to be turned by said spring 180 into inoperative position, with said lever flange 184 against the stop stud 194. Although said lever 183 normally remains in relatively stationary relation on said shaft 174 it is circumferentially adjustable thereon; said shaft having the worm gear 195 fixed thereon as shown in Figs. IX and X in engagement with the worm 196 fixed on the worm shaft 197 having the knob 198 by which it may be turned. Although the operative position of said lever 183 is predetermined by said detent 186 fitting in the socket 185 therein, the relative rotary position of said lever 183 and shaft 174 may be adjustably determined by rotation of said knob 198 so that the distance between the axis of the drum 8 and the axis of the platen 172 in the coöperative position thereof may be varied in accordance with the thickness of the paper to be printed or the depth of printing impression desired. Of course, said arrangement permits adjustment of the platen to compensate for wear or shrinkage of its resilient rubber surface 173.

Referring to Figs. VI and VII; the paper feeding mechanism includes the feed roller 200 above the table 7, journaled at one end in the rotatably adjustable eccentric bearing 201 in the frame 1, but idly rotary with its axis stationary. Said roller 200 has high sections spaced by reduced portions 202 and is opposed by and driven by the pressure of the feed roller 203 below said table 7, having correspondingly spaced sections on the shaft 204, with rubber faces 205 to engage the paper 6. Said roller 203 is raised to coöperative relation with said roller 200 by the rock shaft 208 having the lever arms 209 in which said shaft 204 is journaled, and the spring 210 tending to turn said shaft in the direction of the arrows shown in Figs. VI and IX. One end of said spring 210 being connected to said shaft 204 and the other end to the bushing 206 as indicated in dotted lines in Fig. IX, the torque on said shaft may be varied by rotary adjustment of said bushing in the frame 1, in which it is normally held stationary by the set screw 207. Said arms 209 also carry the cross bar 211 having the paper stop fingers 212 in registry with openings in the guide plate 213 and table 7, so that when said arms 209 are lowered each paper sheet 6 may be thrust against said fingers to insure its proper angular relation with the machine before being gripped by the upward movement of said roller 203 against the roller 200. Said stop fingers 212 are raised from engagement with the paper sheet 6 when the latter are thus gripped, and, said roller 203 is positively rotated by its gear 214 which is connected with the gear 171 by the idle gear 215 which turns loosely on said shaft 208. Said shaft 208 is turned against the pressure of said spring 210 to lower said roller 205 and stop fingers 212 by the arm 216 having the stud shaft 217 extending through the slot 218 in the frame 1 and carrying exterior thereto the friction roller 219 in position to be encountered by the high portion 17 on the cam 16.

The discharge of the printed sheets 6 from between said drum 8 and platen 172 is facilitated by the sectional rollers 221 on the shaft 144, each having a corrugated soft rubber face 222 upon which said sheets rest and are directed against the inclined guide strips 223 shown in Figs. VI and VII, so that said sheets fall into the rack 224 shown in Fig. I.

The number of sheets 6 which have been printed is indicated by the counter 225 including mechanism of any convenient form, for instance a series of decimally numbered disks 226 on a common shaft 227 shown in Fig. II provided with the operating lever 228 which is connected by the link 229 with the roller 219 so that said lever 228 is oscillated once during each revolution of the drum 8 to make a unit increase in the number manifested by said counter 225 at its exposed front 230.

Said shafts 83, 174, 200 and 208, etc., are respectively provided with the normally stationary but rotatably adjustable eccentric bearings 85, 178, 201 and 206 etc. so that said shafts may be adjusted in precisely parallel relation with the axis of the printing drum 8, and, it may be observed that such construction not only simplifies and facilitates the primary assembling of the machine but affords means to compensate for wear of the respective shafts, bearings and rollers.

The mechanism above described may be used as follows: The type 25 being set in the desired form in the flexible chase shown in Fig. XIII, said chase is attached to the drum 8, and covered with the ink transfer sheet 50 as shown in Fig. VI. The guides 3 on the paper chute 2 shown in Fig. I being set to direct cut sheets of paper 6 of the desired size in the desired relation to the width of said type form; the cam 16 is rotatably adjusted on said drum 8 so that when each sheet 6 is presented against the stop fingers 212 it will be gripped at the proper instant to be drawn between said drum 8 and the platen 172 in such relation as to locate the printed impression thereon in the desired position with respect to the length of said sheet. The ink gates 110 shown in Fig. V being spaced and set in accordance with the width and location of the desired impression, and ink of the proper color and consistency being stored between said rollers 97 and 100 as indicated in Fig. VII; the mechanism is rotated by the handle 12 to dispense a sufficient quantity of said ink upon the rollers 97, 104 and 105 to coat the transfer roller 82 with a film thereof sufficient to replace upon the transfer sheet 50 or type 25, after each impression, the amount of ink which is removed therefrom by each impression of the type form. A sheet of paper 6 being then inserted over the table 7 beneath the guide plate 213 against the stop fingers 212, and, said drum 8 being turned, in the direction of the arrow marked thereon, said feed roller 203 grips said sheet 6 against the feed roller 200, to draw it between said drum 8 and platen 172, print it, and discharge it over the roller 221, so that, being deflected by the guide strips 223, it falls into the rack 224.

Although the operation of the entire machine as above described may be initiated, regulated and terminated by manipulation of the controlling mechanism 232 for the motor 153 shown in Fig. I; the operator may at any instant during such operation press the button 191 to operate the lever 188 and thus render the platen 172 inoperative, to terminate the printing operation without stopping the machine. Moreover, I have indicated in Fig. I an automatic electric stop mechanism including the switch 234 arranged to coöperate with the cam 16 on said drum 8 to release said lever 188 by the magnet 235 if the paper is not fed properly between the rollers 200 and 203, but, said automatic stop mechanism is the subject of another application for Letters Patent of the United States and therefore, is not specifically described herein.

Of course, the inking mechanism above described may be rendered inoperative by turning the lever 72 in the direction of the arrow marked thereon in Fig. III to withdraw the carriage 63 of the inking mechanism to inoperative position without stopping the machine or interrupting the printing operation above described; said ink transfer sheet 50 being saturated with ink like the ribbon used on ordinary typewriting machines. However, if the ink for the printed impressions is solely derived from any textile fabric said impressions must be successively lighter because of the depletion of ink from said fabric, even though the latter be moved between successive impressions to present different regions thereof for such impressions. Therefore, the inking mechanism described is advantageous in that it is capable of reinking said sheet 50 after each impression so as to maintain it uniformly inked throughout the operation of printing any desired number of impressions; for instance, several thousand impressions may be made of uniform appearance during one continuous operation of the machine.

I do not desire to limit myself to the employment of any fabric on the drum 8, to receive the ink for the printed impressions as the faces of the type 25 may be directly inked by the roller 82, said sheet 50 being employed to produce impressions resembling typewriting.

The detachable flexible type chase above described being the subject of my Letters Patent of the United States 989,277, dated April 11, 1911; I do not desire to limit my present invention to such a chase, as other means may be employed for holding the type 25 on the drum 8, for instance, channel bars like the bars 26 may be rigidly connected with said drum.

As shown in Figs. III, IV and VII the right hand side member of the frame 1 is conveniently provided with the notch 236 at its upper edge so that said type 25 may be inserted and removed with respect to the drum 8, conveniently by means of such a composing and distributing stick as described in Letters Patent of the United States #955,534, granted to me April 19, 1910. Therefore, I do not desire to limit myself to the precise details of construction and arrangement above described as it is obvious that various modifications may be made therein without departing from the essential features of my invention as defined in the appended claims.

I claim:—

1. A printing drum having means to detachably hold an inking surface thereon, including a flexible sheet having attaching plates with pairs of holes at its respectively opposite ends, a pair of stationary studs on said drum adapted to engage in either pair of said holes in one of said plates, and a pair of leashes projecting from said drum, including hooks adapted to engage the holes in the other of said plates and connected by flexible tapes to spiral springs arranged to reciprocate in tubes extending in said drums.

2. A printing drum having means to detachably hold an inking surface thereon, including a flexible sheet having attaching plates with pairs of holes at its respectively opposite ends, a pair of stationary studs on said drum adapted to engage in a pair of holes in one of said plates, and a pair of leashes projecting from said drum, including hooks adapted to engage the holes in the other of said plates and connected to spiral springs extending in said drum.

3. A printing drum having means to detachably hold an inking surface thereon, including a flexible sheet having attaching plates with holes at its respectively opposite ends, said holes being respectively differently located transversely with respect to said sheet, means adapted to selectively engage different holes, whereby said sheet may be held in different positions to permit it to be uniformly worn out, including a stud on said drum adapted to engage a hole in one of said plates, and a leash projecting from said drum and having a hook adapted to engage a hole in the other of said plates.

4. The combination, with a printing drum, of a flexible sheet having attaching plates with pairs of holes at its respectively opposite ends differently located transversely with respect to said sheet, and means carried by said drum adapted to selectively engage said pairs of holes, whereby said sheet may be held in different positions to permit it to be uniformly worn out.

5. A printing drum having means to detachably hold a member thereon, including a leash projecting from said drum, having a hook connected by a flexible tape to a spiral spring arranged to reciprocate in a tube extending in said drum.

6. The combination with a frame; of a printing couple including a rotary drum; means on said drum arranged to hold type; means arranged to carry in stationary relation with said drum an ink transfer sheet of textile fabric extending over the faces of type thereon, including stationary studs in said drum arranged to engage said sheet at one end, and, flexible spring pressed leashes arranged to engage said sheet at the opposite end, each of said leashes comprising a flexible metal tape projecting through an opening in the drum and having a hook at the outer end and a spring at the inner end, whereby said leashes are normally drawn into said drum by said springs.

7. The combination, with a frame, of a printing couple including a rotary drum having a shaft journaled in said frame, means on said drum arranged to hold type, means arranged to carry in stationary relation with said drum an ink transfer sheet of textile fabric extending over the faces of type thereon, including a stationary stud projecting from the face of said drum arranged to engage said sheet at one end, and a flexible spring-drawn leash projecting from the interior of the drum and arranged to removably engage said sheet at its opposite end outside of and adjacent to the face of the drum.

8. The combination with a rotary type carrying drum; of an ink transfer sheet of textile fabric; means arranged to detachably hold said sheet over the faces of type on said drum, comprising metal plates at opposite ends of said sheet, a pair of stationary studs projecting from said drum in engagement with one of said end plates, and a pair of leashes projecting from said drum in engagement with the opposite end plate; each of said leashes comprising a flexible metal tape having a hook at its outer end and a spring at its inner end within said drum, tending to draw said leash into said drum.

9. The combination, with a rotary type carrying drum, of an ink transfer sheet, means arranged to detachably hold said sheet over the faces of type on said drum comprising plates at opposite ends of said sheet, a stud projecting from said drum in engagement with one of said end plates, and a leash projecting from said drum in engagement with the opposite end plate, said leash comprising a flexible connector having plate engaging means at its outer end and a spring at its inner end.

10. The combination, with a rotary type carrying drum, of an ink transfer sheet, means arranged to detachably hold said sheet over the faces of type on said drum, comprising a plate at one end of said sheet, and a flexible leash projecting from the interior of the drum through an opening therein and having means exterior of the drum to detachably engage said plate whereby the transfer sheet may be held under tension.

11. The combination with a frame; of a printing couple including a rotary drum; means arranged to hold type on said drum; an ink transfer sheet; means on said drum holding said sheet stationary over the printing face thereof; a carriage mounted to slide on said frame toward and away from said drum; means arranged to shift said carriage on said frame; an ink fountain; means detachably connecting said fountain with said carriage; and, inking roller mechanism supported by and movable with said carriage and coacting with the transfer sheet in the drum.

12. The combination with a frame; of a printing couple including a rotary drum; means arranged to hold type on said drum; an ink transfer sheet; means on said drum holding said sheet stationary over the printing face thereof; a carriage mounted to slide on said frame toward and away from said drum; means arranged to shift said carriage on said frame; an ink fountain; means detachably connecting said fountain with said carriage; and, inking roller mechanism supported by and movable with said carriage and coacting with the transfer sheet on the drum.

13. The combination with a frame; of a printing couple including a rotary drum; means arranged to hold type on said drum; an ink transfer sheet; means on said drum holding said sheet stationary over the printing face thereof; a carriage mounted to slide on said frame toward and away from said drum; means arranged to shift said carriage on said frame; and, inking mechanism supported by and movable with said carriage and coacting with the transfer sheet on the drum.

14. The combination, with a platen, of a rotary member coacting therewith, means removably mounted on the rotary member and carrying a page form of assembled type, a fabric extending over said type and stationarily mounted at one of its ends on the rotary member, there being means for applying spring tension to the other end of the fabric, and a roller bearing against the outer side of the fabric on a line directly opposite a line of type for inking said fabric for each impression.

15. The combination of a rotary type carrying drum, means for holding a form of type thereon, a tension device within the drum and projecting through an opening in it including a strap having a hook adjacent to its free end, a fabric entirely exterior of the drum, means for holding one end of it on the drum beyond one end of the form, the other end of the fabric being engaged and kept taut by said hook.

16. The combination of a rotary type carrying drum, an inking fabric entirely exterior of the drum, means arranged to detachably hold the fabric over the faces of the type on the drum comprising plates at the opposite ends of the fabric, a stud projecting from the drum in engagement with one of said plates, and a spring-drawn strap carried partly within the drum and projecting out of it through an opening therein and adapted to engage the plate at the other end of the fabric.

17. The combination of a rotary printing drum, an inking fabric, means on the drum for holding the fabric stationary over the printing face, a carriage mounted to slide toward and away from the drum, an inking roller mounted in the carriage and adapted to bear against the outer side of the fabric on the drum, an inking fountain carried by the said carriage, and means for conveying ink from it to the roller.

In testimony whereof, I have hereunto signed my name at Burlington, New Jersey, this twenty-sixth day of September, 1910.

SAMUEL A. NEIDICH.

Witnesses:
JOHN W. DAVIS,
GEORGE B. GARWOOD.